(No Model.)
H. T. MORSE.
WATER WHEEL.
No. 263,196. Patented Aug. 22, 1882.
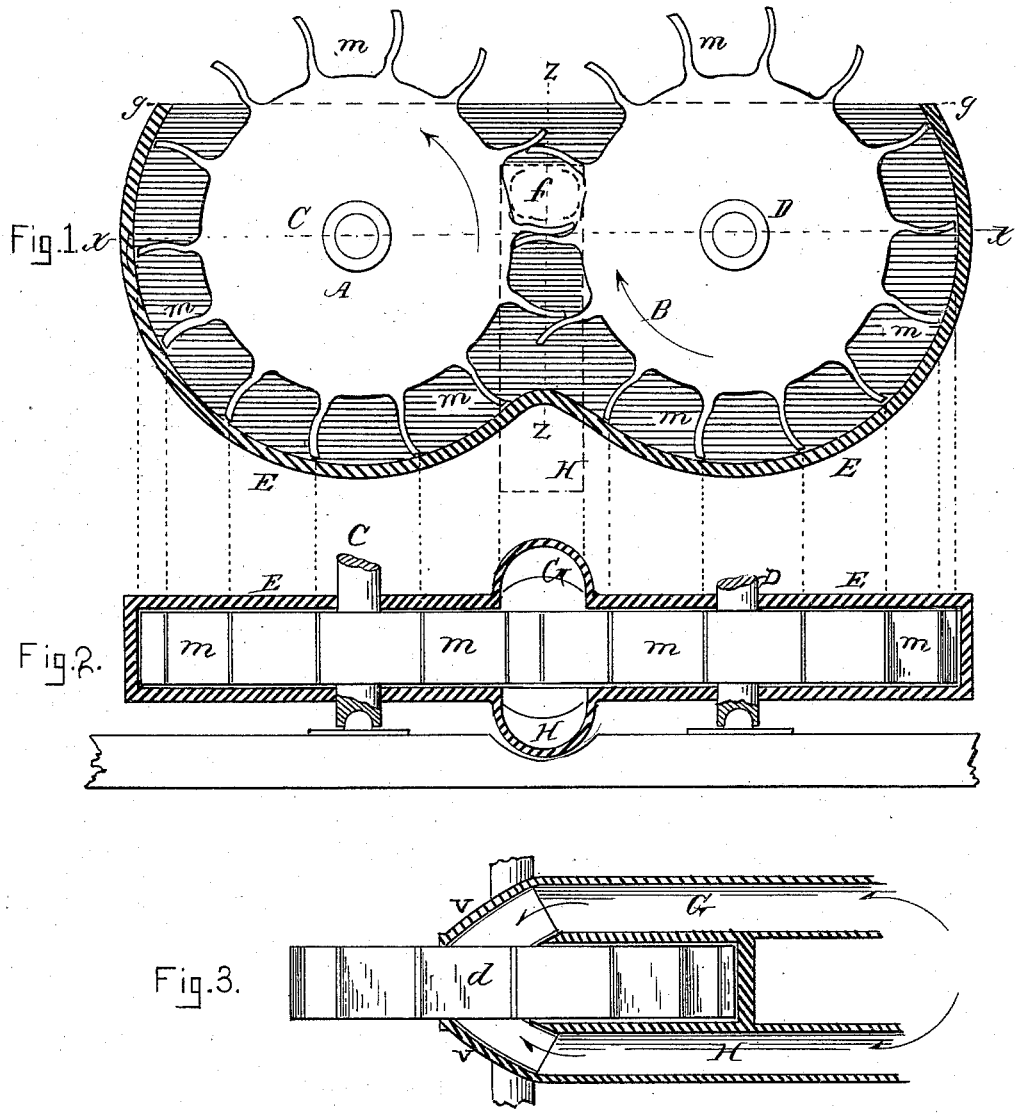

United States Patent Office.

HENRY T. MORSE, OF BOSTON, MASSACHUSETTS, ASSIGNOR TO HIMSELF, AND EBEN F. PILLSBURY AND WILLIAM B. FRINK, OF SAME PLACE.

WATER-WHEEL.

SPECIFICATION forming part of Letters Patent No. 263,196, dated August 22, 1882.

Application filed June 5, 1882. (No model.)

*To all whom it may concern:*

Be it known that I, HENRY T. MORSE, of Boston, in the county of Suffolk, State of Massachusetts, have invented a certain new and useful Improvements in Water-Wheels, of which the following is a description sufficiently full, clear, and exact to enable any person skilled in the art or science to which said invention appertains to make and use the same, reference being had to accompanying drawings, forming a part of this specification, in which—

Figure 1 is a sectional top or plan view, representing the wheel with cap of the curb removed; Fig. 2, a vertical transverse section taken on the line $x$ $x$ of Fig. 1, and Fig. 3 a vertical longitudinal section taken on the line $z$ $z$ of Fig. 1.

Like letters of reference indicate corresponding parts in the different figures of the drawings.

My invention relates to that class of water-wheels known as "turbine;" and it consists in a novel construction and arrangement of the parts, as hereinafter more fully set forth and claimed, by which a more effective device of this character is produced than is now in ordinary use.

The wheel proper consists of two disks, A B, arranged on the same plane, and journaled horizontally on the vertical shafts C D in the curb or casing E, and respectively provided with a series of radial flanges or buckets, $m$ $m$, curved or bent in opposite directions, and so disposed on the peripheries of the disks as to intermesh, as shown in Fig. 1.

The water is introduced to the wheel through a double conduit arranged transversely to the curb E, and consisting of the pipes G H, the pipe G passing centrally above or over the curb and the pipe H in like manner under or beneath the same.

The conduit-pipes are each provided with inwardly-inclined nozzles $v$ $v$, as best seen in Fig. 3, and after crossing the center of the wheel, as indicated by the line $x$ $x$, discharge conjointly at $d$ into the space $f$, formed by the intermeshing of four of the buckets, as shown in Fig. 1.

It will be seen that the water employed for driving the wheel is but slightly diverted from a direct course, and that as the disks revolve each pair of buckets close tightly against the inflowing stream, and thus receive its full force.

The curb E is open on the line $g$ $g$, permitting the buckets $m$ $m$ to protrude as they revolve, thus giving free vent to the wheel and overcoming choking and nearly all other difficulties which pertain to this class of wheels arising from centrifugal action. By curving or bending the buckets $m$ $m$ in opposite directions, as shown and described, they are prevented from interlocking as the disks revolve, and the friction between them is reduced, the contact-surface being less than it would be with straight buckets.

It will be obvious that the wheel may be constructed with but one pipe, if desired, though two are preferable; also, that the disks may be arranged vertically or in some other than a horizontal position without departing from the spirit of my invention.

Having thus explained my improvement, what I claim is—

The improved water-wheel described, the same consisting of the curb or casing E, pipes G H, shafts C D, and disks A B, provided with the buckets $m$ $m$, constructed and arranged to operate substantially as specified.

HENRY T. MORSE.

Witnesses:
C. A. SHAW,
H. E. METCALF.